July 30, 1929.  J. ROCHE  1,722,311

DIMMING HEADLIGHT FOR AUTOMOBILES

Filed March 3, 1928

Inventor
John Roche
By Williamson

Patented July 30, 1929.

1,722,311

UNITED STATES PATENT OFFICE.

JOHN ROCHE, OF HOBOKEN, NEW JERSEY, ASSIGNOR OF ONE-HALF TO WILLIAM P. VERDON, OF HOBOKEN, NEW JERSEY.

DIMMING HEADLIGHT FOR AUTOMOBILES.

Application filed March 3, 1928. Serial No. 258,711.

My invention relates to new and useful improvements in dimming headlights for automobiles, being a continuation in part of my former application for patent, Serial Number 238,481, dated December 8, 1927, and has for its object to provide a simple and effective device for dimming the light rays from an electric lamp so as to avoid the glare heretofore incident to the head lights of motor vehicles and to increase and decrease this modifying of the light.

A further object of my present invention is to put under the control of the driver the increasing or decreasing of the light projected from the head light by simple and effective means, thus enabling the driver to use the head lights of an automobile under a given code to warn oncoming traffic of his intention to turn in one direction or another or to transmit other information by such a code.

With these and other ends in view, this invention consists in the details of construction and combination of elements hereinafter set forth and then specifically designated by the claim.

In order that those skilled in the art to which this invention appertains may understand how to use and make the same, I will describe its construction in detail, referring by numerals to the accompanying drawings, forming a part of this application, in which:—

In carrying out my invention as herein embodied, 10 represents the casing of a motor vehicle head light in which is mounted the reflector 11, and this reflector has a superimposed layer 12 of a translucent gum-like coating, through which, when the rays of light pass to the reflector and are returned therefrom, they are modified to prevent the undue glare which is incident to the reflection of light from an electric lamp.

Figure 1:
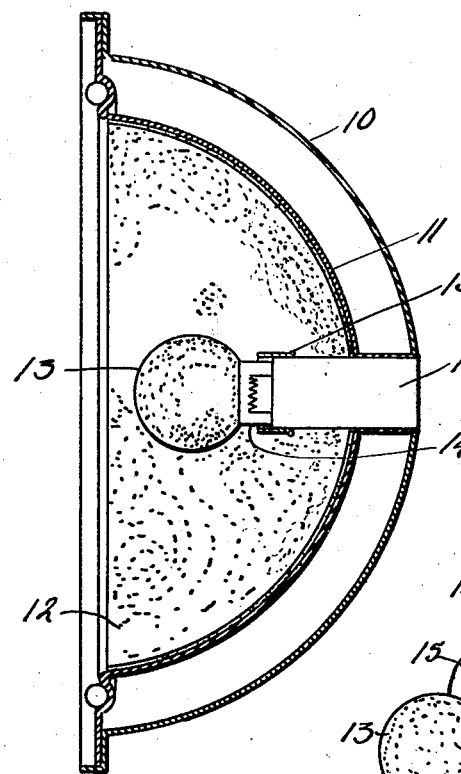
Fig. 1, is a central section of an automobile head light showing my improvements applied thereto.

13 represents the electric lamp bulb mounted at the center of this reflector, said lamp also having a super-imposed layer of translucent material through which the rays of light pass from the lamp, thus modifying these rays to prevent an intensed concentrated glare in front of the head light. In the form of my invention shown in Fig. 1, the shank 14 of this bulb is left transparent and I provide a shield 15 so mounted upon the socket 16 as to be readily moved back and forth upon the latter, thus providing for the shutting off of more or less of the light passing through the transparent shank of the bulb.

This arrangement provides for increasing or decreasing the intensity of the light passing to the reflector through the super-imposed layer 12, thus giving the user of the head light any illumination of the road bed which he may desire to meet the varying requirements of motor vehicle traffic.

Figure 2:
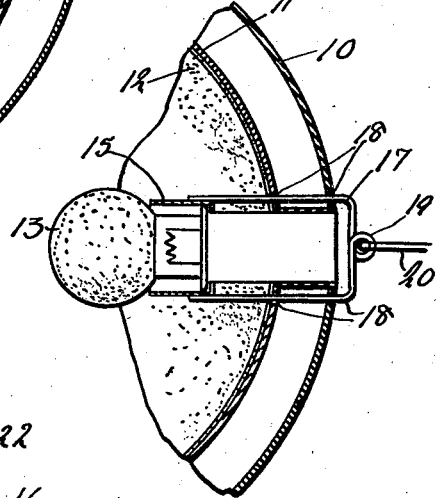
Fig. 2, is a view similar to Fig. 1 partly broken away, showing a slightly modified form of my invention.

In Fig. 2, I have shown means for putting the movements of the shield 15 under the control of the driver which means consist of a yoke 17, the parallel members of which pass through suitable holes 18 in the casing and reflector of the head light and are secured to the shield, this yoke being provided with an eye 19 for the attachment of a suitable rod 20 which latter may extend to the instrument board of the automobile so as to be in easy reach of the driver.

When this rod is moved back or forth the shield will be moved to cover or uncover the transparent shank of the bulb, thus permitting the driver to regulate the amount of light projected from the head light.

Figure 3:
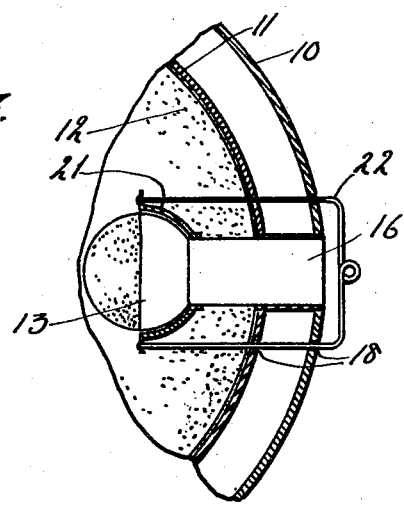
Fig. 3, is a view similar to Fig. 2 showing a still further modified form of this invention.

In Fig. 3, I have shown a still further slight modification of the present invention, in which a portion of the bulb 13 is left transparent and a concaved shield 21 adapted to fit over this transparent portion of the bulb is mounted upon the socket 16 in such manner as to slide back and forth for permitting the unmodified light to pass through that portion of the bulb or to shut off said light.

A yoke 22 similar to the yoke 17 is passed through the holes 18 and secured to the shield so as to put the movements of the latter under the control of the driver.

This last described construction is especially advantageous since the putting of the variation of the light under the control of the driver may be accomplished by the use of the ordinary electric lamp bulb having a portion thereof made to modify the rays of light passing therethrough and requiring only a simple and inexpensive yoke for the operation of the shield.

Of course I do not wish to be limited to the exact details of construction as herein shown, as these may be varied within the limits of the appended claim without departing from the spirit of my invention.

Having thus fully described my invention, what I claim as new and useful is:—

In a motor vehicle head light, a reflector, means to modify the reflecting qualities thereof, an electric lamp mounted at the center of said reflector, the bulb of said lamp being coated with a light modifying substance, and having a transparent shank, a filament located within said shank, and means for obstructing more or less of the light rays passing through said shank.

In testimony whereof, I have hereunto affixed my signature.

JOHN ROCHE.